(12) United States Patent
Matousek et al.

(10) Patent No.: US 10,492,363 B2
(45) Date of Patent: Dec. 3, 2019

(54) REAR GRAIN CART HANDLING ASSEMBLIES FOR AN ARTICULATED HARVESTING COMBINE

(71) Applicant: Tribine Industries LLC, Logansport, IN (US)

(72) Inventors: Robert A. Matousek, Valley Center, KS (US); Darren J. Nelson, Hutchinson, KS (US)

(73) Assignee: Tribine Industries LLC, Logansport, IN (US)

( * ) Notice: Subject to any disclaimer, the term of this patent is extended or adjusted under 35 U.S.C. 154(b) by 37 days.

(21) Appl. No.: 15/689,416

(22) Filed: Aug. 29, 2017

(65) Prior Publication Data

US 2017/0367261 A1    Dec. 28, 2017

Related U.S. Application Data

(63) Continuation-in-part of application No. 14/946,842, filed on Nov. 20, 2015, now Pat. No. 9,901,030.

(51) Int. Cl.
*A01D 41/12*    (2006.01)
*A01D 61/00*    (2006.01)

(52) U.S. Cl.
CPC ....... *A01D 41/1208* (2013.01); *A01D 61/008* (2013.01)

(58) Field of Classification Search
CPC ............ A01D 41/1208; A01D 41/1217; A01D 41/12; A01D 69/03; A01D 69/005; A01D 90/02; A01D 90/10; A01D 90/14; B60P 1/40; B60P 1/42
See application file for complete search history.

(56) References Cited

U.S. PATENT DOCUMENTS

| | | | | |
|---|---|---|---|---|
| 8,434,624 B2* | 5/2013 | Redekop | ................ | A01D 90/02 209/137 |
| 8,435,104 B2* | 5/2013 | Dillon | ................ | A01D 41/1208 460/100 |
| 9,211,830 B1* | 12/2015 | Hensley | ................ | B60P 1/40 |
| 9,738,216 B2* | 8/2017 | Kendrick | ................ | A01F 15/08 |
| 2003/0101704 A1* | 6/2003 | Johnson | ............. | A01D 41/1208 56/100 |
| 2015/0351324 A1* | 12/2015 | Schiewer | ................ | F16H 47/02 74/720 |
| 2016/0192589 A1* | 7/2016 | Foster | .................. | A01D 69/005 56/10.7 |

\* cited by examiner

*Primary Examiner* — Glenn F Myers
(74) *Attorney, Agent, or Firm* — Mueller Law, LLC; Jerry K. Mueller, Jr.

(57) ABSTRACT

A grain harvesting articulated combine of a forward crop processing power unit (PPU), a rear grain cart, and an articulation joint that connects the PPU with the rear grain cart and includes an auger assembly that moves clean grain from the PPU to the rear grain cart. Two pump circuits deliver power to a pair of hydrostatic motors located in the rear grain cart, one pump circuit hydrostatic motor driving the grain unloader assembly, the other pump circuit hydrostatic motor driving the ascending fill lift auger assembly, the drag auger assemblies, and the articular joint auger assembly. Power (inertia) can be harvested from auger assemblies not moving grain for startup or clog clearing of the other auger assemblies.

6 Claims, 15 Drawing Sheets

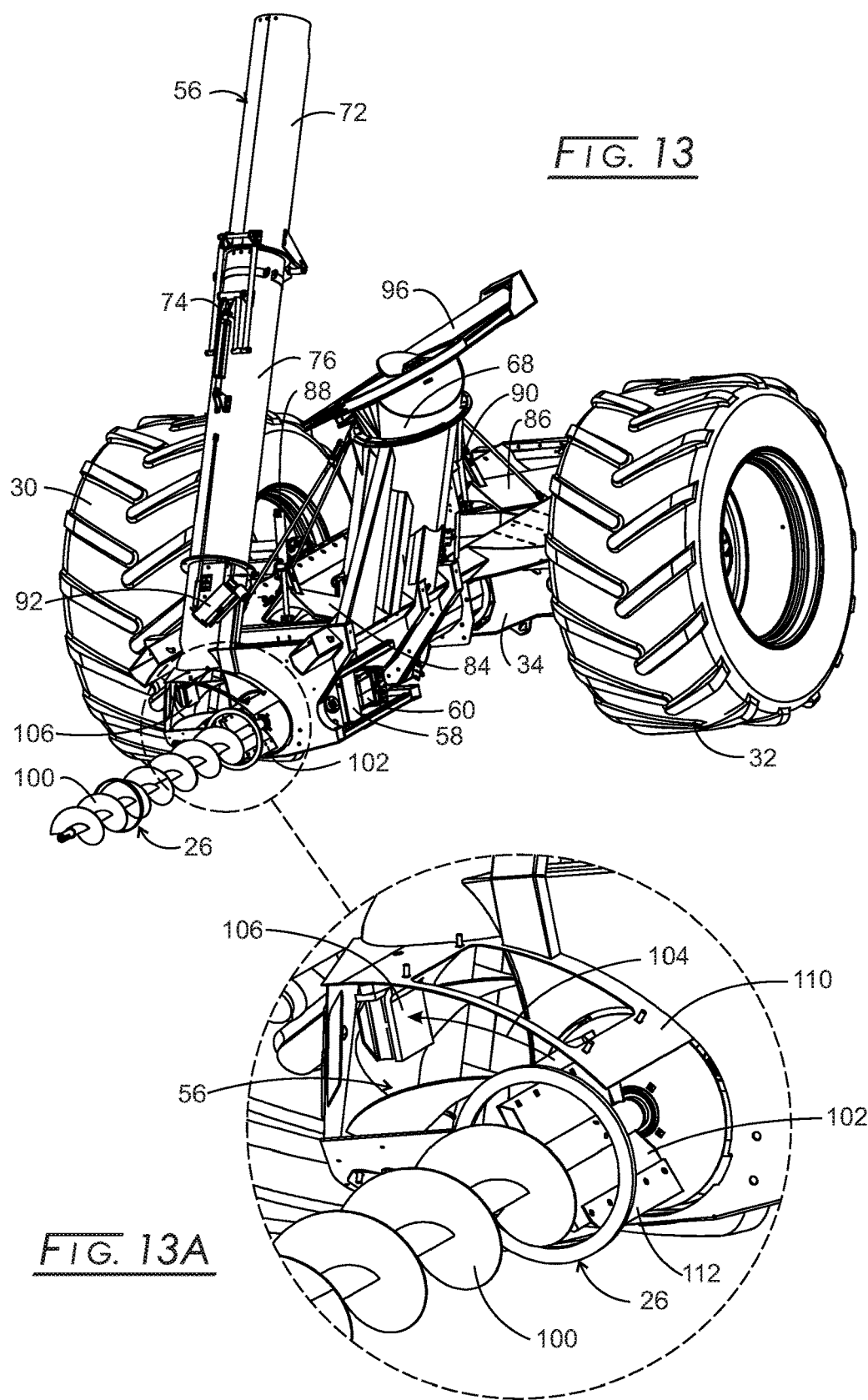

REAR GRAIN CART HANDLING ASSEMBLIES FOR AN ARTICULATED HARVESTING COMBINE

CROSS-REFERENCE TO RELATED APPLICATIONS

This application is a continuation-in-part of application Ser. No. 14/946,842 filed Nov. 20, 2015.

STATEMENT REGARDING FEDERALLY SPONSORED RESEARCH

Not applicable.

BACKGROUND

The present disclosure relates to a system and method to unload grain from a grain tank on an agricultural harvester to a transport vehicle, and specifically to an improved rear grain cart of an articulated agricultural harvester.

While the design of the grain cart in U.S. Ser. No. 14/946,842, now U.S. Pat. No. 9,901,0303, is a substantial improvement in the art, a reliable increased maximum grain unload rate was desired with decreasing power requirements therefor. Moreover, increased startup torque to the augers also was desired to guard against stall. It also was noted that the design had no inertia to be "harvested" from other turning components when the source of power to each component came from a separate source, as must be true of individual hydraulic motors.

In order to give each component adequate size to provide ample break-away torque, the displacement of each motor would have to grow to such size that, when in operation, the entire system would have required massive hydraulic flow and many large hydraulic lines going from the front module to the rear module across the articulation joint. In order to achieve desired results in a cost effective and reliable manner, it became apparent that the original design would have to be modified.

To somewhat contain costs, the smaller components needed to be powered by hydraulic motors instead of hydrostatic motors, with the incumbent requirement that maximum system pressure would be 3,000 psi rather than the 6,000 psi known for hydrostatic systems. Thereby, the amount of power that could be delivered by a given size (diameter) of conduit (hose) would by default be % of the amount that the conduit could conduct (to the rear module across the hinge joint) if the system were hydrostatic.

The presently disclosed articulated combine is based on an improved rear grain cart having improved grain handling, improved design, and improved grain unloading.

BRIEF SUMMARY

A grain harvesting articulated combine includes a forward crop processing power unit (PPU), a rear grain cart, and an articulation joint that connects the PPU with the rear grain cart and includes an auger assembly that moves clean grain from the PPU to the rear grain cart. Housed within the rear grain cart are an ascending fill lift auger assembly that receives clean grain from the forward PPU and transports it upwardly and dumps the clean grain into the rear grain cart; a pair of drag auger assemblies located at the bottom of the rear grain cart and dragging grain inwardly; and a grain unloader assembly that receives grain from the drag auger assemblies and unloads clean grain from the rear grain cart.

Only two pump circuits are required for delivering power to a pair of hydrostatic motors located in the rear grain cart. A first pump circuit hydrostatic motor drives the grain unloader assembly. A second pump circuit hydrostatic motor drives the ascending fill lift auger assembly, the drag auger assemblies, and the articular joint auger assembly.

The second pump circuit hydrostatic motor is connected to a clutched common chain box for power distribution. Current features for today's agricultural harvesters can be based on features disclosed in U.S. Pat. Nos. 8,286,984, 8,292,008, and 8,435,104.

BRIEF DESCRIPTION OF THE DRAWINGS

For a fuller understanding of the nature and advantages of the present method and process, reference should be had to the following detailed description taken in connection with the accompanying drawings, in which:

FIG. 13 is a front isometric view of the grain transfer and unloading equipment of the disclosed rear grain cart of the articulated combine of FIG. 1;

FIG. 13A is a detailed enlarged view of the grain transfer and grain yield sensor from FIG. 13;

FIG. 19 is a sectional view taken along line 19-19 of FIG. 18, and.

DETAILED DESCRIPTION

Figure 20:
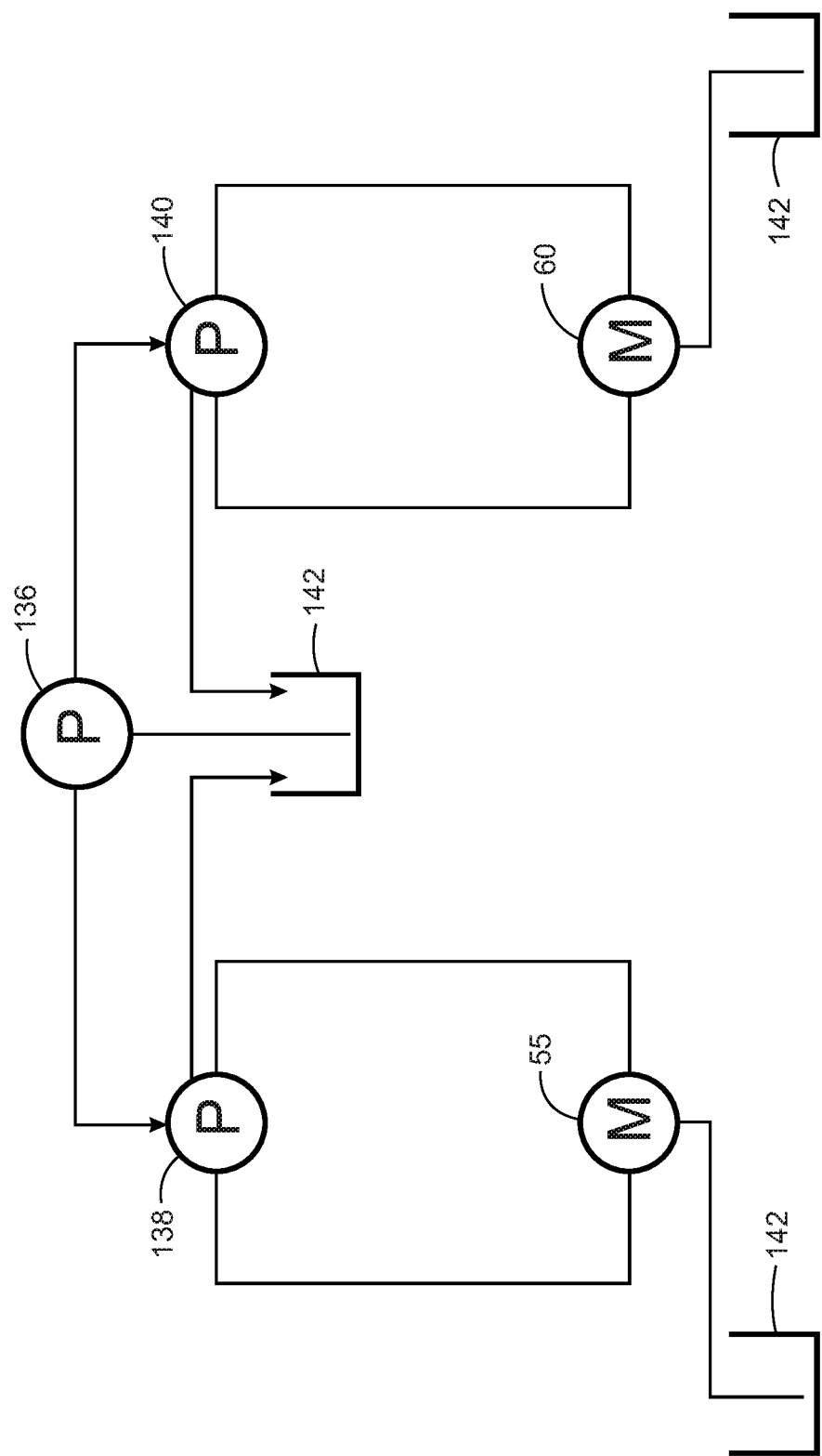
FIG. 20 is a simplified schematic of the hydraulic circuits for the rear grain cart.

The disclosed rear grain cart design addresses the foregoing shortcomings. All of the power needed to drive augers is transmitted to the rear module at hydrostatic pressures and flow rates in only two pump circuits—one circuit, as shown in FIG. 20, including a charge pump, 136, with a case drain, 142, for the two pump circuits, a first circuit including a first pump, 138, feeding a first motor, 55, and case drain 142 for the swinging the unloader auger that moves in and out, and the other second circuit again fed by charge pump 136 and including a second pump, 140, feeding a second motor, 60, with drain 142—running all other augers in the rear grain cart. The two bottom drag augers (front and rear in the grain cart), the drawbar auger carrying grain from the front module to the rear module, the bubbler or inclined tank fill auger receiving grain from the drawbar auger to fill the grain cart grain bin, and the unloader lift auger are driven with power delivered to the rear module by a large hydrostatic motor that drives a common chain box for power distribution. By doing this, any one component of these augers can realize startup or clog-clearing torque (power) that can, perhaps, be as large as the level delivered by a large hydrostatic motor. With the inertias of each of the components being tied to the whole system, startup of a given component can harvest inertia from others that already may be turning, resulting in available power instantaneously exceeding even the output of the main motor (for an impulse period). It, then, becomes the art of configuring drive circuits that allow the main motor driven chain box to distribute the power to the various augers located in the rear grain cart (or rear module). The power, motors, and pumps delivering power to the rear grain cart augers are detailed in U.S. Ser. No. 15/643,685 filed Jul. 7, 2017 (now, U.S. Pat. No. 10,257,977).

The articulated agricultural harvester or combine (these terms being synonymous and used interchangeably) in the drawings is a Tribine™ harvester (Tribine Industries LLC, Logansport, Ind.) having a grain bin capacity of 1,000 bushels of clean grain and unloads the clean grain at a rate of 540 bushels per minute (9 bushels/second). Normal grain removal from an elevated grain bin uses an unload auger running from the back to the front of the grain bin for transferring grain to the unload arm assembly. When grain is unloaded from the grain bin in this fashion, grain preferentially is removed from the rear of the grain bin; thus, leaving the remaining grain in the front of the grain bin. This can cause weight on the tongue (articulation joint) to increase from near zero to around 8,600 lbs. The disclosed grain cart auger feed system and unload auger system evens out grain removal and unloads virtually all of the grain in the grain cart very rapidly.

Figure 1:
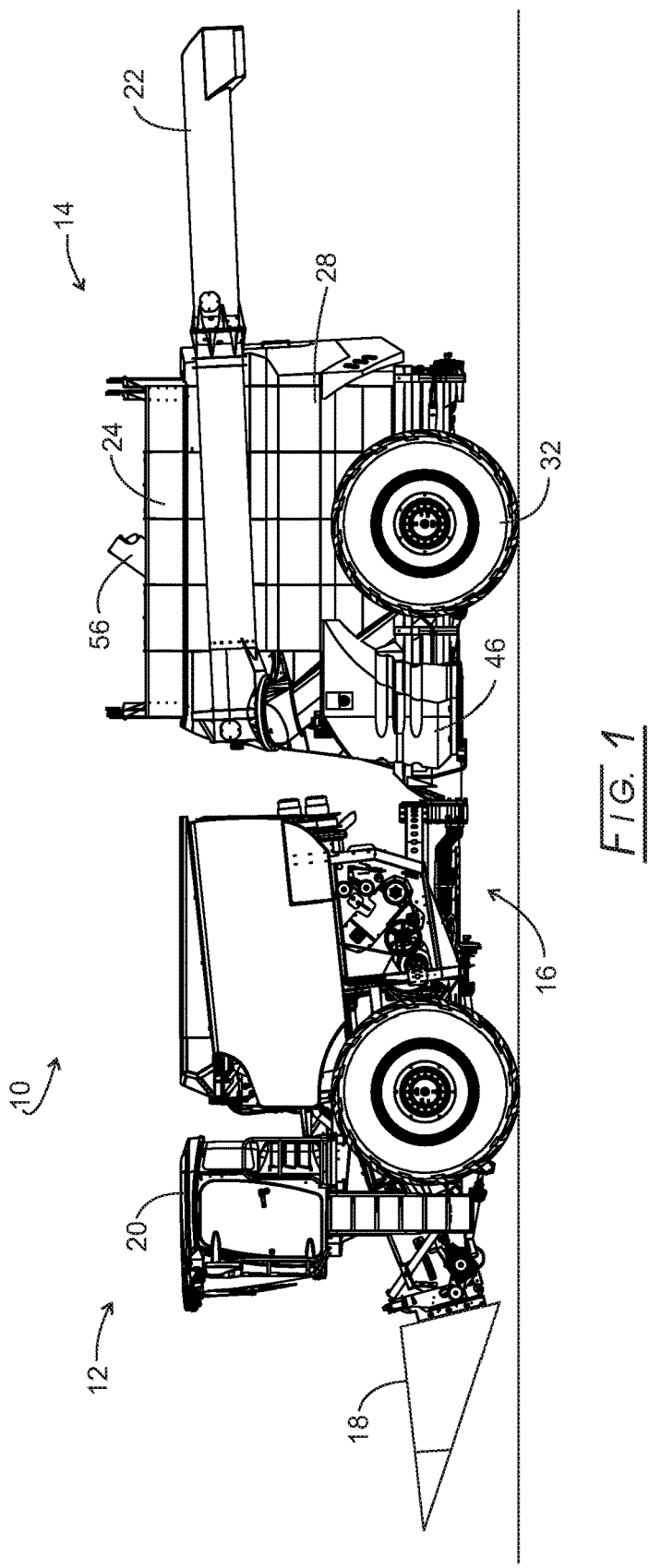
FIG. 1 is a side elevation view of an articulated combine having the disclosed grain cart.
Figure 2:
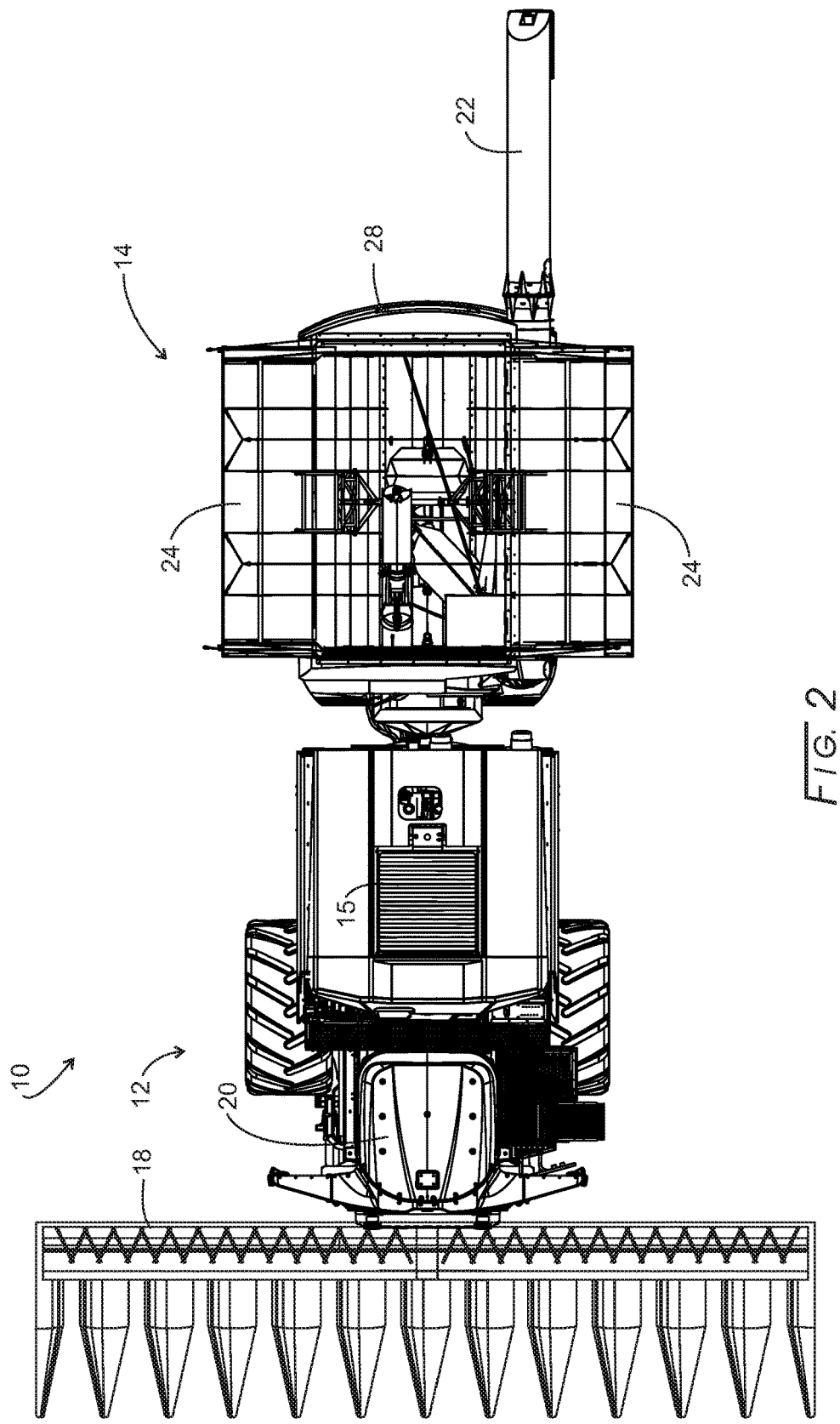
FIG. 2 is an overhead view of the articulated combine of FIG. 1.
Figure 3:
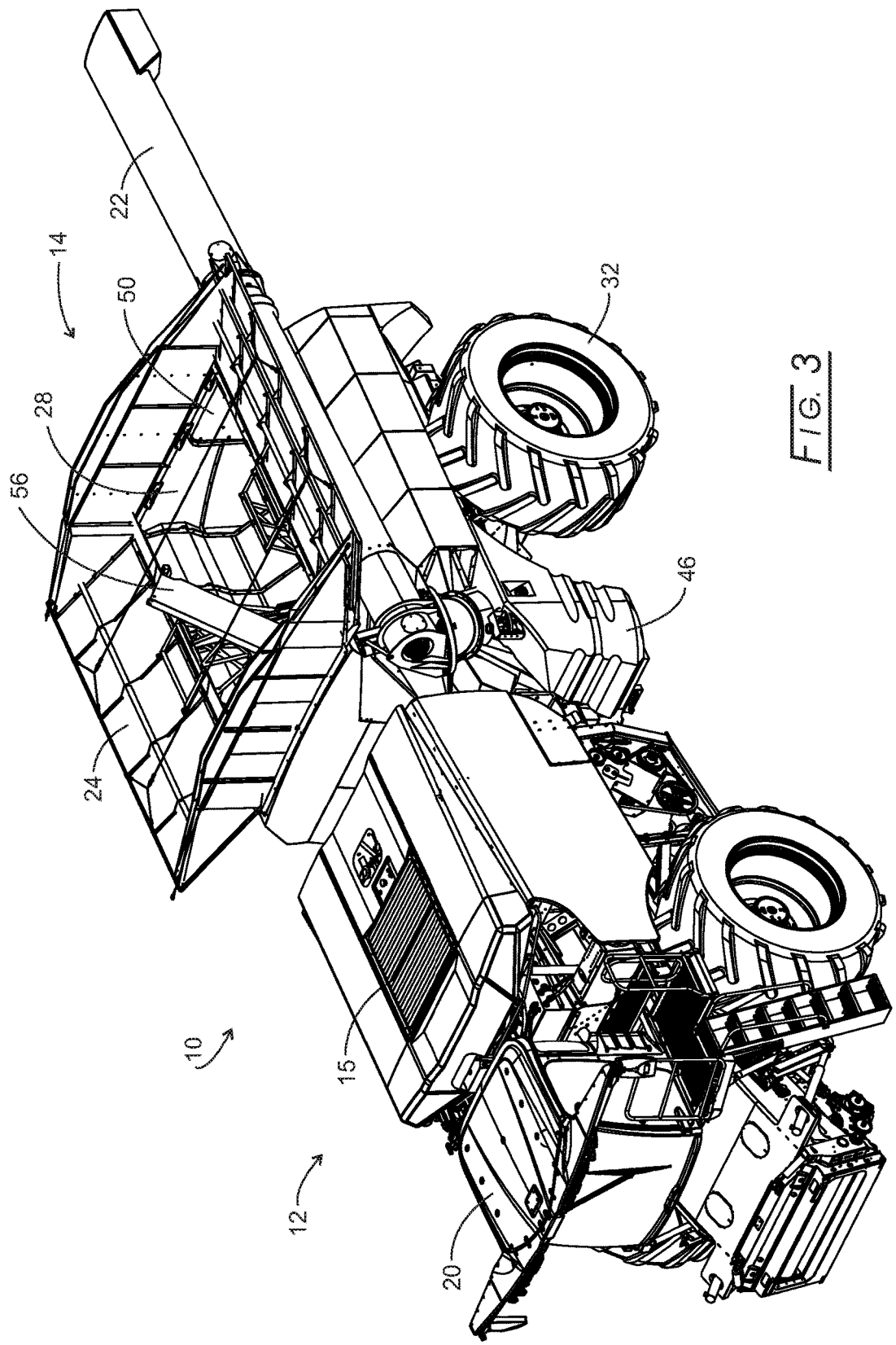
FIG. 3 is an isometric view of the articulated combine of FIG. 1.

Referring initially to FIGS. 1, 2, and 3, an articulated harvester, 10, consists of a powered forward powered processing unit (hereinafter, PPU), 12, a rear grain cart, 14, and an articulation joint, 16, that connects forward PPU 12 with rear grain cart 14. The details of articulation joint 16 and grain auger assembly 26 are disclosed in commonly owned application Ser. No. 14/946,827 filed Nov. 20, 2015. Forward PPU 12 carries a grainhead, 18, operator's cab, 20, grain cleaning and handling assembly (not shown), and engine (not shown). The grain cleaning and handling assembly in forward PPU 12 is disclosed in commonly owned U.S. Pat. No. 9,820,442 (application Ser. No. 14/967,691 filed Dec. 14, 2015). Forward PPU 12 is devoid of any grain storage, such being exclusive in rear grain cart 14. While both forward PPU 12 and rear grain cart 14 are shown being carried by wheel assemblies, one or both could be tracked. A screened air inlet, 15, is located atop forward PPU 12.

An off-loading auger assembly, 22, is in the folded home position and being carried by rear grain cart 14. Grain cart 14 also bears a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. Clean grain is stored in grain cart 14, the sides of which may be made of plastic also in keeping with desirable weight reduction; although, it could be made of metal also at the expense of weight. All plastic parts may be filled with particulate or fiber reinforcement in conventional fashion and could be laminate in construction.

Figure 4:
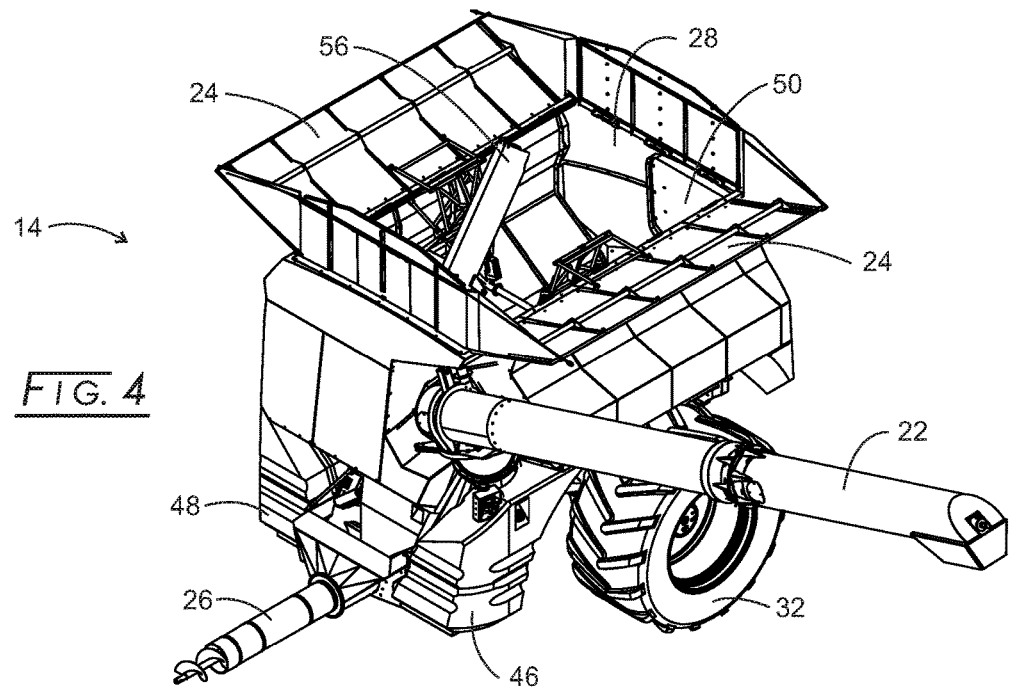
FIG. 4 is an isometric view of the disclosed rear grain cart of the articulated combine of FIG. 1.
Figure 5:
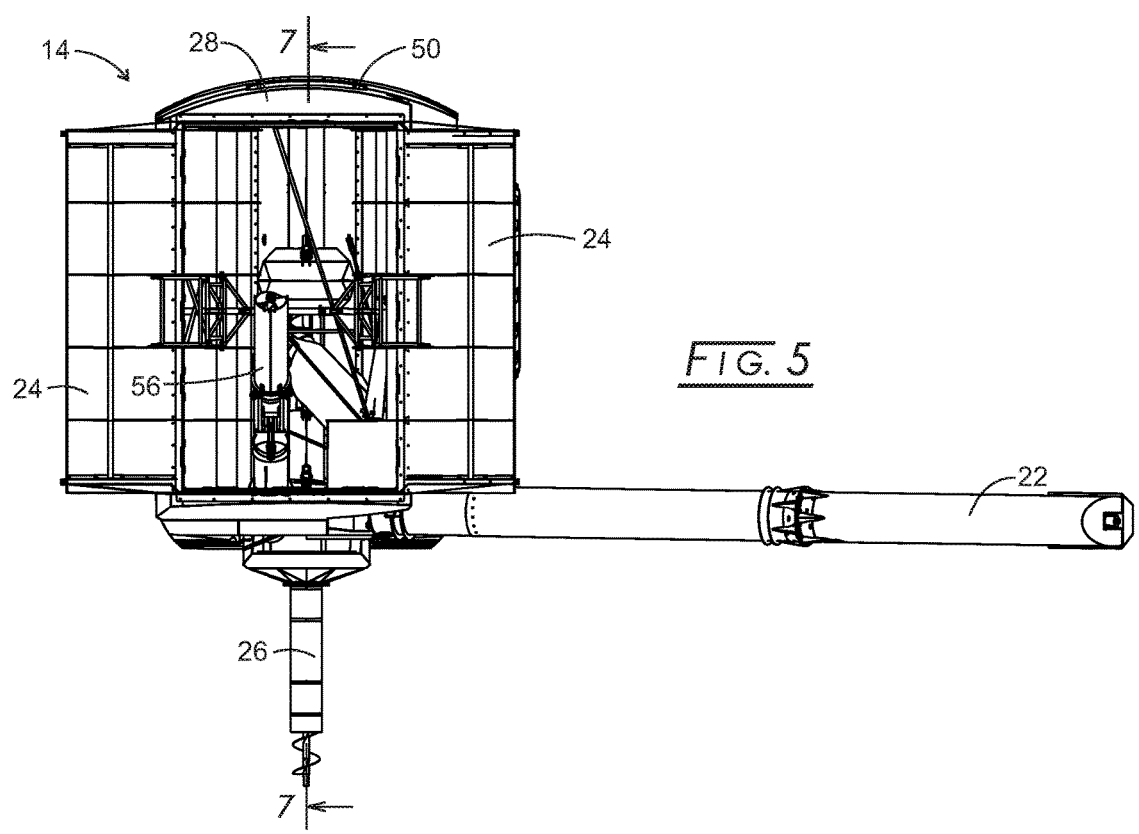
FIG. 5 is an overhead view of the disclosed rear grain cart of the articulated combine of FIG. 1.
Figure 6:
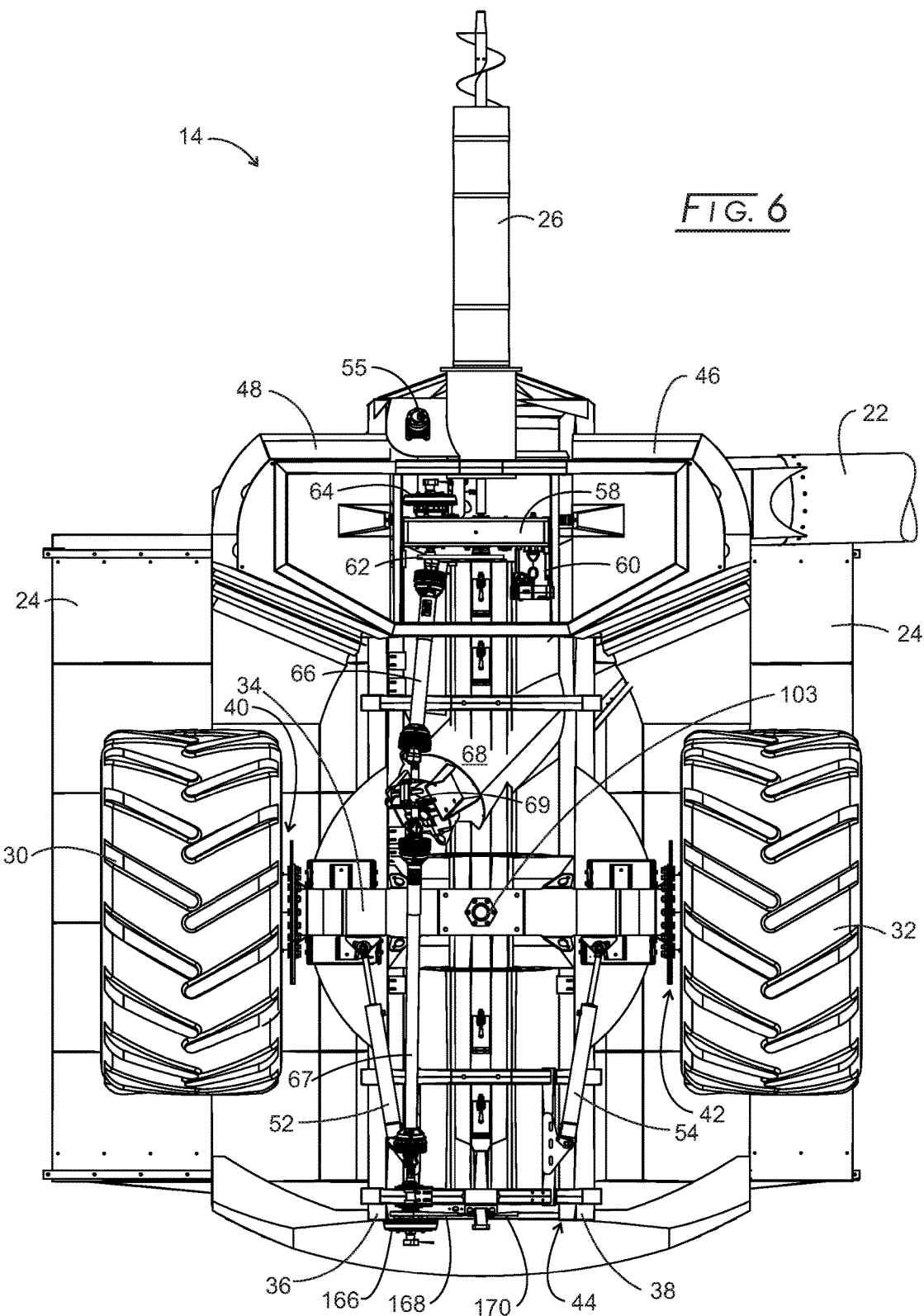
FIG. 6 is a bottom view of the disclosed rear grain cart of the articulated combine of FIG. 1.

Referring now to FIGS. 4 and 5, clean grain from PPU 12 is fed to grain cart 14 through a grain auger assembly, 26, which is part of articulation joint 16, by a motor not seen in the drawings. As seen in FIG. 6 also, rear grain cart 14 rides on a pair of tired wheel assemblies, 30 and 32, connected by an axle assembly, 34. Hydraulic motor and gear reduction assemblies, 40 and 42, are fitted within each wheel assembly 30 and 32, respectively, for powering rear grain cart 14. The grain bin rests atop frame supports, 36 and 38, which are part of rear grain cart frame assembly, 44. Rear grain cart 14 also carries fuel tanks, 46 and 48 for the engines in forward PPU 12. A hatch, 50, is located at the rear of grain storage bin 28 to provide entry into its interior for repair and maintenance purposes. Steering rod and piston assemblies, 52 and 54, connect to frame assembly 44, as seen best in FIG. 6. While the various auger assemblies are hydraulically powered in the drawings, electrical motors and pneumatic motors could be used. Not all lines and hydraulic motors can be seen in the drawings.

Figure 9:
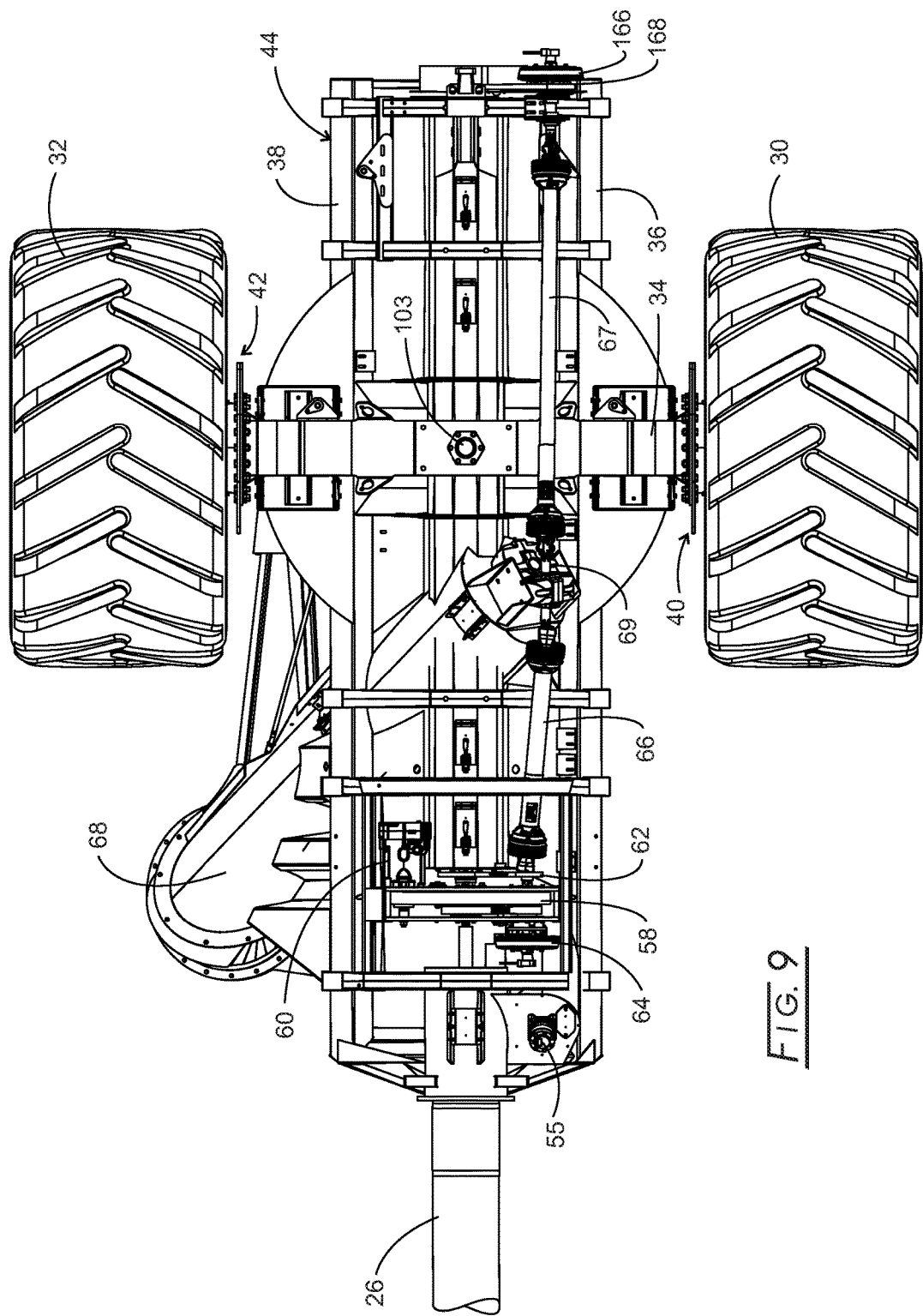
FIG. 9 is a bottom view of the disclosed rear grain cart with the rear wheel steering system and some of the support structure removed to better see the augers and drives.
Figure 10:
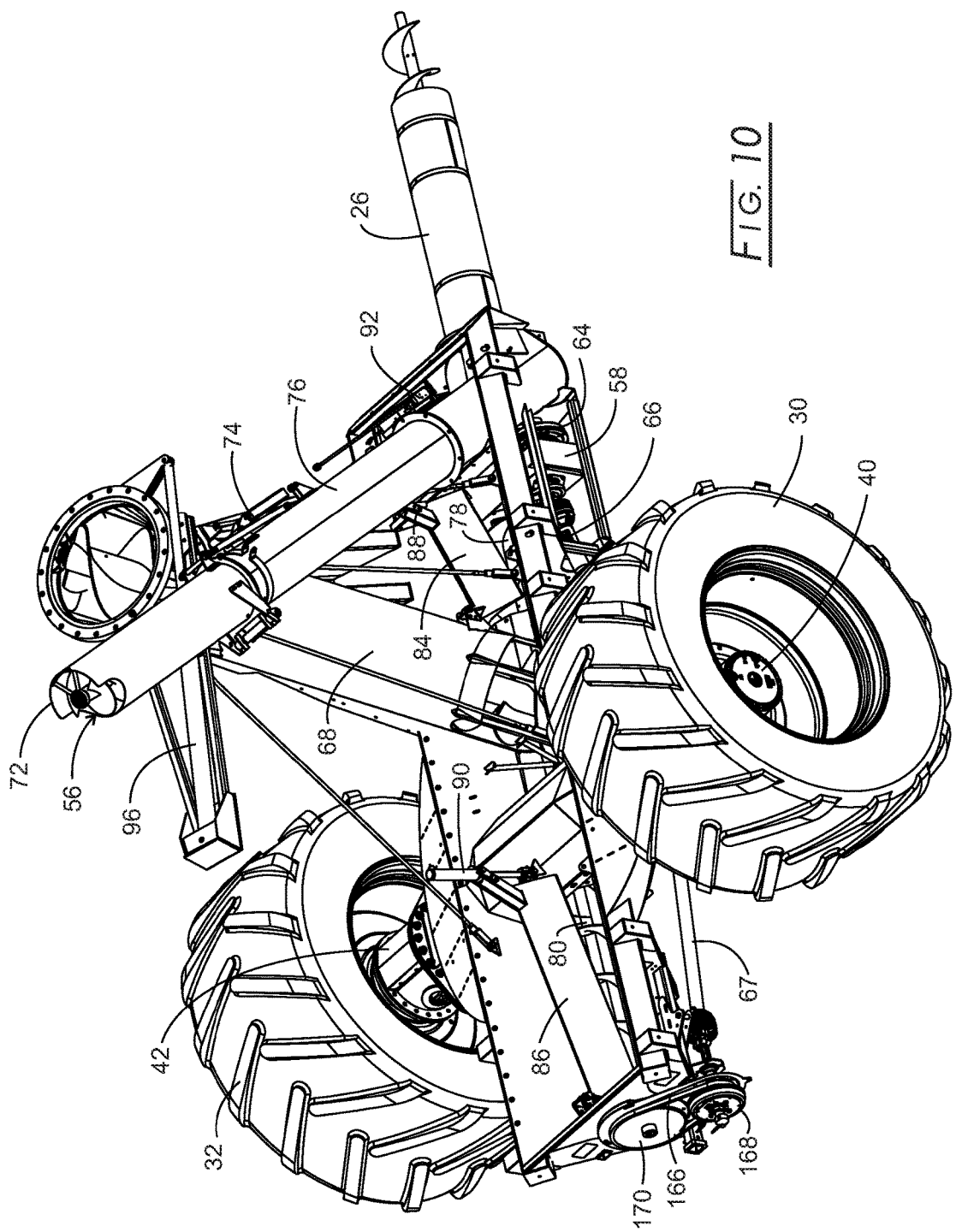
FIG. 10 is an isometric view of the grain transfer and unloading equipment of the disclosed rear grain cart of the articulated combine of FIG. 1.

Referring in more detail to FIGS. 6 and 9, a hydraulic motor, 55, powers a bubbler or slanted grain lift auger assembly, 56 (see FIG. 7 and described in detail later herein), which takes the clean grain from PPU 12 and distributes such into rear grain cart 14. A main gearbox, 58, is located adjacent to a main motor, 60, that drives sprockets through a chain drive, 62, for carrying power to various augers in grain cart 14. An electric clutch assembly, 64, is used conventionally to apply and withdraw power from main motor 60. Main motor 60 provides power for bubble auger assembly 56, a drive shaft, 66, for an unloader auger assembly, 68. Grain auger assembly 26 and bubbler auger assembly 56 run so long as main motor 60 is running and not clutched. As such, they provide inertia for all of the other auger assemblies for startup, clog clearing, and other instances when needed. Main motor 60 also powers the auger of grain auger assembly 26 feeding grain from PPU 12 to rear grain cart 14. A rear drive shaft, 67, drives a rear drag auger described later herein. Shafts 66 and 67 are coupled through a gearbox, 69. Shaft 67 is connected at its rear to an electric clutch assembly, 166, and by a chain, 168, to a sprocket, 170, for rotation of rear drag auger 80 (see FIG. 10 also).

Figure 7:
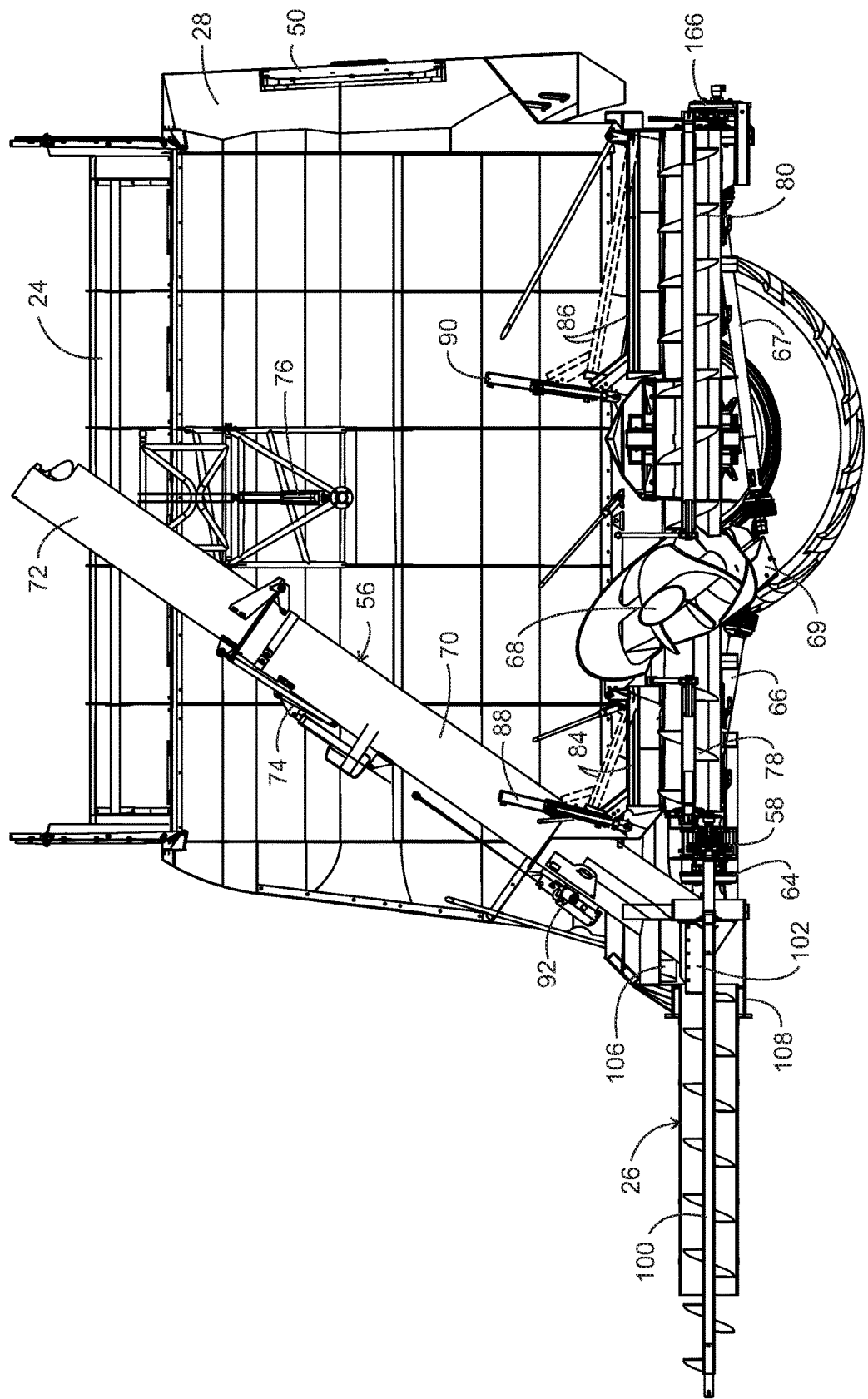
FIG. 7 is a sectional view taken along line 7-7 of FIG. 5.

Referring now also to FIG. 7 in addition to FIG. 6, bubbler grain auger assembly 56 is formed of a lower auger section, 70, and an upper auger section, 72, which can be folded by an actuator, 74, in order for roof 24 to be closed by an electric linear actuator, 76, and associated closing structure. A similar electric linear actuator and closing structure is used to close the opposite roof, as seen better in FIG. 2.

Ascending bubbler grain auger assembly receives grain from grain auger assembly 26 and in turn dumps the clean grain into grain cart 14.

Figure 8:
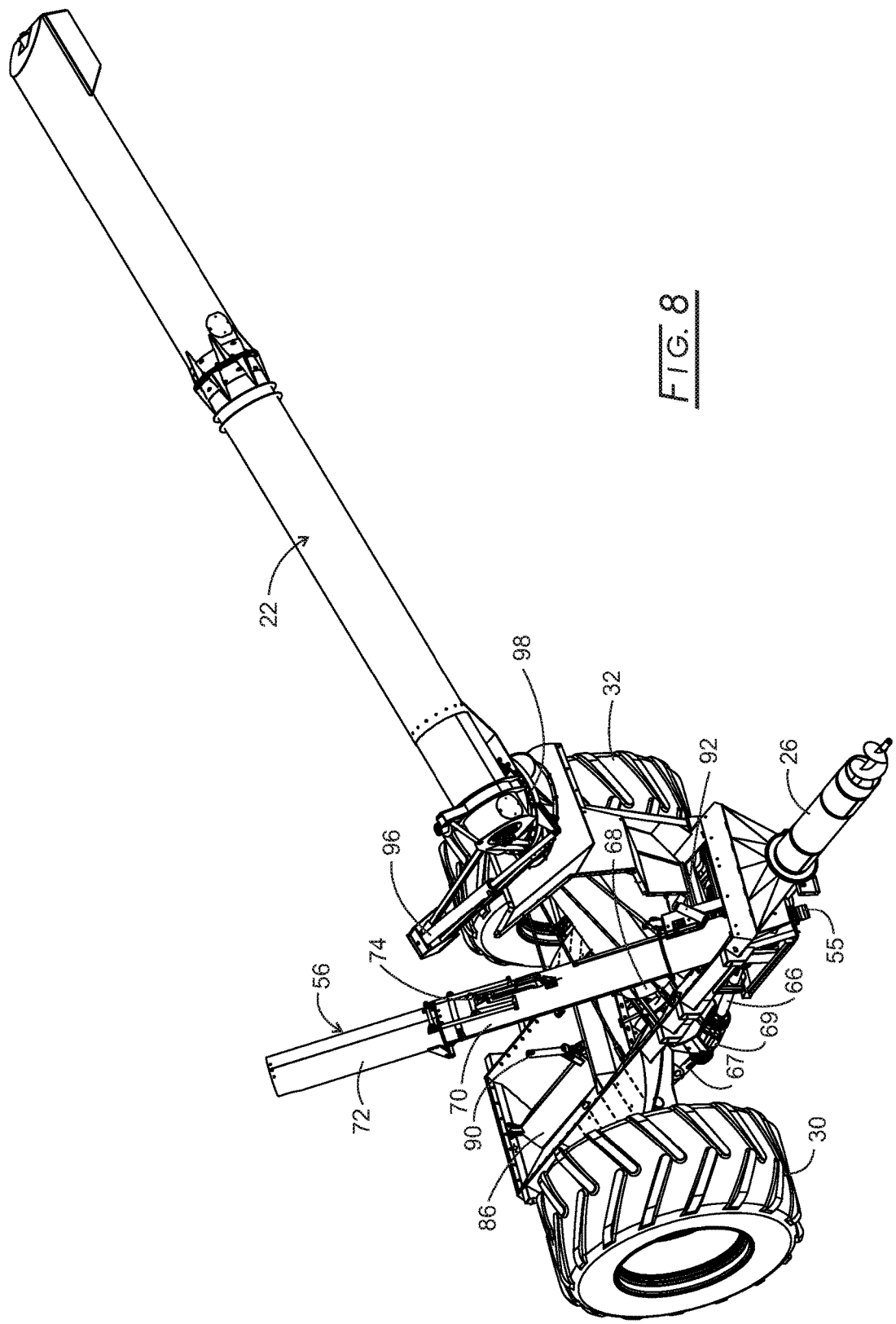
FIG. 8 is an isometric view of the grain transfer and unloading equipment of the disclosed rear grain cart of the articulated combine of FIG. 1.
Figure 11:
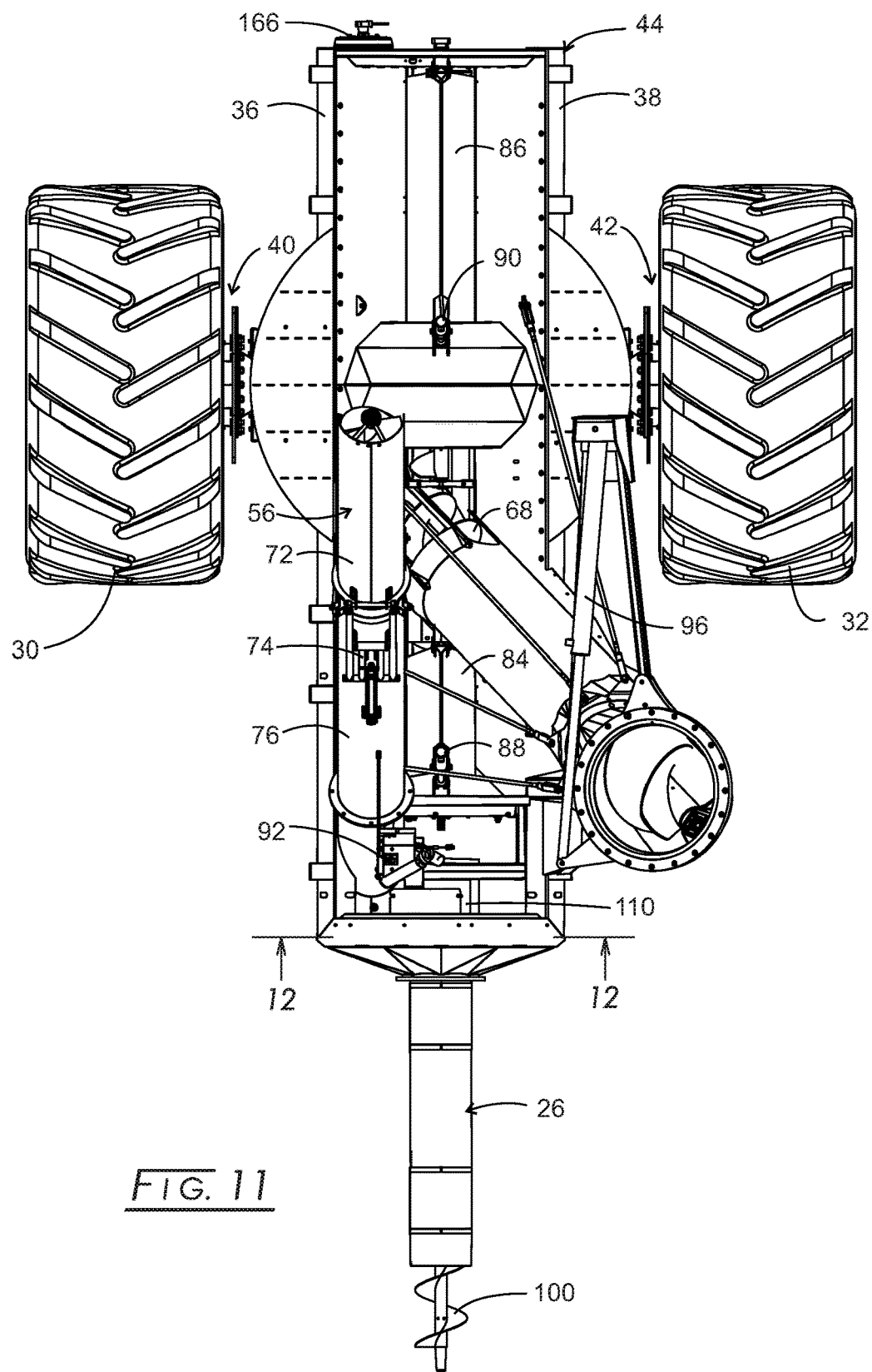
FIG. 11 is a top view of the grain transfer and unloading equipment shown in FIG. 10.
Figure 12:
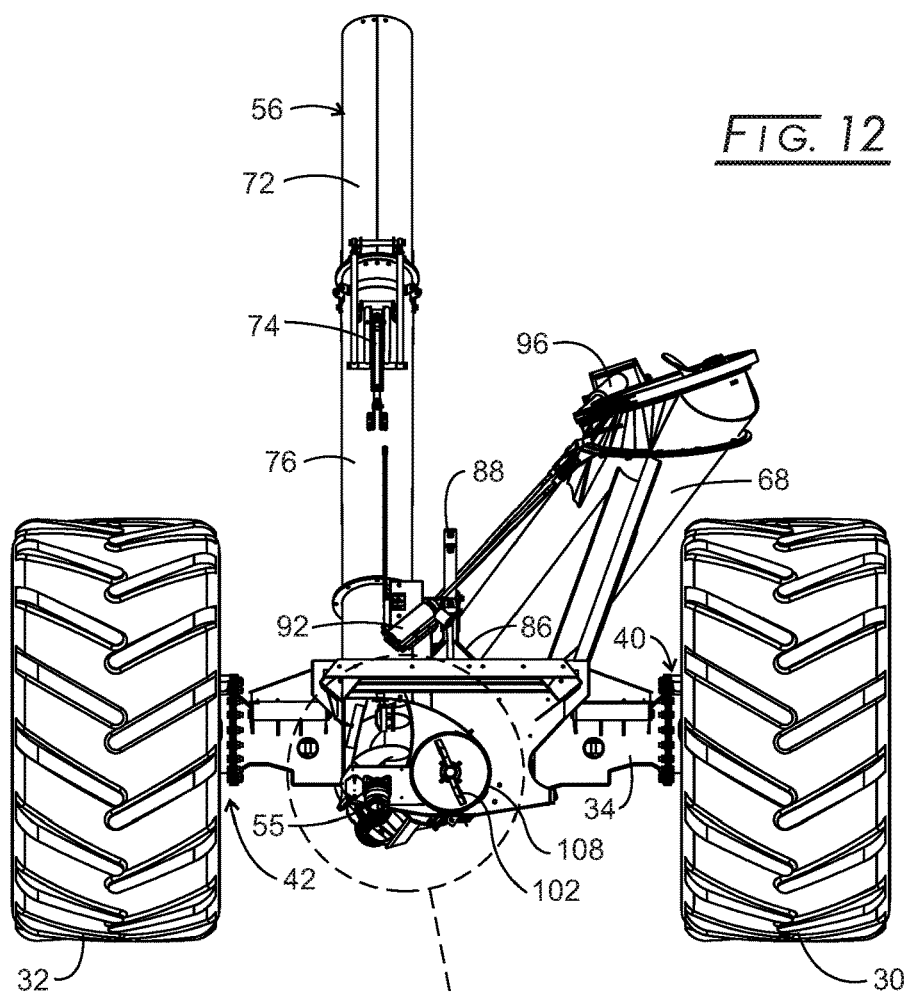
FIG. 12 is sectional view taken along line 12-12 of FIG. 11.
Figure 12A:
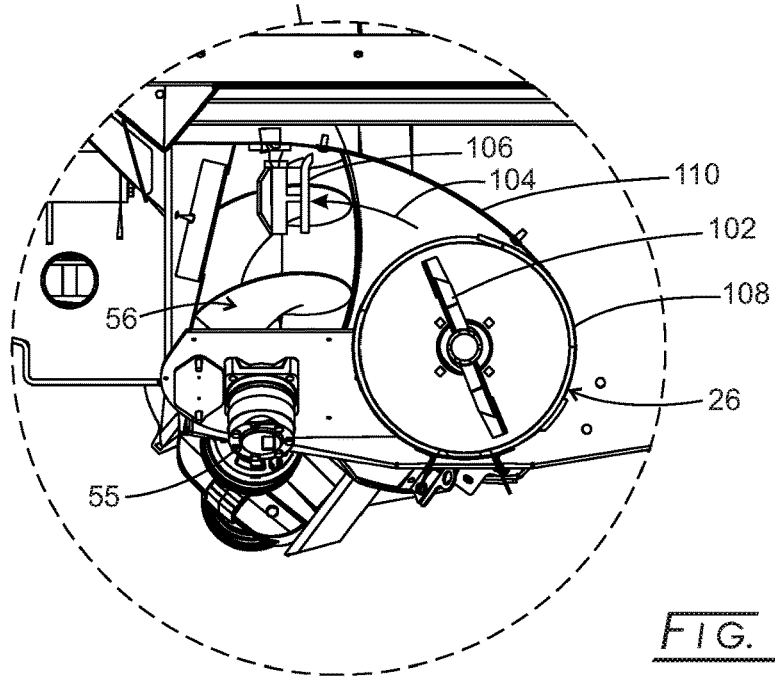
FIG. 12A is a detailed enlarged view of the grain yield sensor, bubbler auger and its drive motor from FIG. 12.

Also seen in FIGS. 7, 8, and 11, are a forward drag grain auger assembly, 78, and rear drag grain auger assembly, 80, both of which drag clean grain towards the central area grain cart 14 where the bottom of a lift auger assembly, 68, which feeds grain off-loading auger assembly 22. Driveshaft 67 powers a clutch assembly, 166, and drives rear drag auger 80. Also seen are doors in phantom, 84, for front drag auger 78 and a door, 86, for rear drag auger 80. The doors are shown in phantom in an up or open position and are raised/lowered by actuators, 88 and 90, respectively. Opening and closing of the doors controls admission of clean grain for movement by the drag augers. Also seen is a moisture sensor assembly, 92, that provides grain moisture readout to the operator. A drive motor, 60, drives lift auger assembly 68 through drive shaft 66. A linear actuator, 96, permits rotation of off-loading auger assembly 22 for off-loading grain and for its folding and unfolding through slew bearing assembly, 98, as described in detail in U.S. Ser. No. 14/946,842, cited above.

The grain yield sensor assembly is seen if FIGS. 7, 12, 12A, 13, and 13A. In particular grain auger tube assembly 26 moves clean grain from PPU 12 to rear grain cart 14. At the grain cart end of tube 26, auger, 100, housed within auger tube assembly 26 is terminated with a paddle assembly, 102, rotating counterclockwise, as is auger, 100. A portion of the clean grain is flung along the direction of arrow 104 onto an impact sensor pad, 106, that is the flow rate, measuring device common to combine harvester grain elevators in the trade. Grain yield impact sensor pad 106 provides a measure of the amount of clean grain moving into grain cart 14.

In particular, tube 26 is inserted a bit (say, about 6") into a larger diameter tube, 108. The flights of auger 100 terminate a short distance (say, about 2") before the end of tube 26. Paddle assembly 102 start where the flights terminate and initially are a smaller diameter (say, about 11"), which, then, increases in diameter to its full diameter (say, about 14") once inside larger diameter tube 108. This was done because the auger works best (most efficiently) at an RPM that proved to be too slow for the paddles to give the grain sufficient velocity to penetrate into the vertical auger flights at very high grain flow rates. Thereby, the tube surrounding the paddles is of larger diameter than the tube surrounding the auger. The auger works best (considering grain damage) with a clearance of about ¾", while the paddles are best suited for clearance more near ¼". The confluence of all these factors leads to the need for differential diameter.

One of the paddles at the tube 26 end is 90° offset to the end of the flight of auger 100 with the other paddle offset 180° from the first paddle. This feature both aids with the release trajectory of the grain, while also giving that transition flow greater capacity of flow volume. At the grain cart end of tube 108, an opening is created and a roof, 110, extends laterally over to and covers sensor 106 and the feed end of bubbler auger assembly 56. With sensor 106 being roughly 5" wide, and the width of roof 110 being roughly about 14" wide, and sensor 106 necessarily being about 1" from the front wall, sensor 106 is sensing between about 30% to 40% (about 36% for the dimensions given) of the total width of grain flow flung by paddle assembly 102, which is sufficient given the normalizing effects of the above configurations. The 1" gap is necessary to allow flow that is crushed sideways by the plate to be swept past the sensor without negatively affecting sensor reading. It should also be noted both of the paddles carry an end piece, such as an end piece, 112, seen in FIG. 13A, that is back swept in geometry to better facilitate grouping of the grain upon release towards sensor 106.

Referring now to FIGS. 14-19, a slidable end spout or hood, 114, terminates grain off-load auger assembly 22, or simply unloader 22. End spout 114 is composed of a static upper spout assembly, 116, and a slidable lower spout assembly, 118, movable by an actuator, 120. Lower slidable spout assembly 118 is mounted to upper static spout assembly 116 by a pair of drawer slides, 122 and 124.

Figure 16:
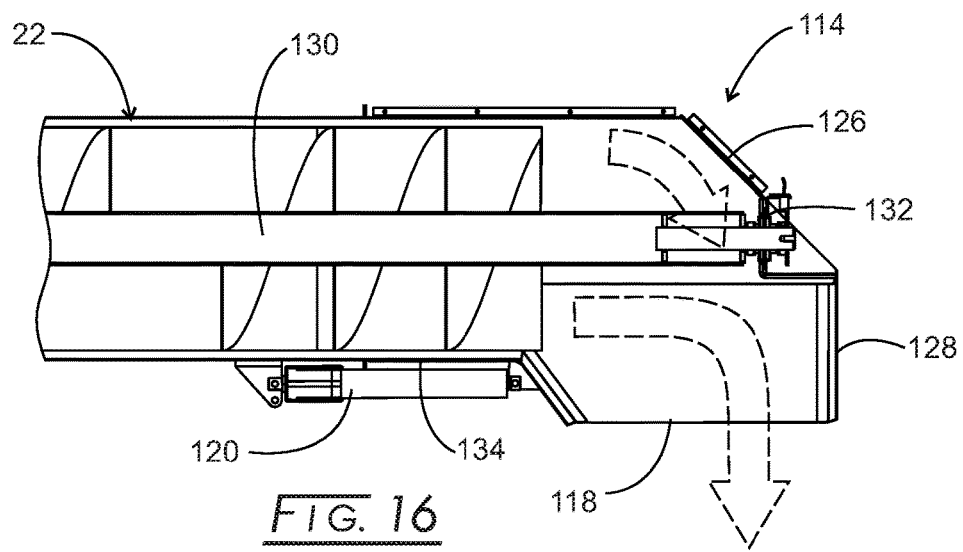
FIG. 16 is a sectional view taken along line 16-16 of FIG. 15.

As best seen in FIG. 16, a front or end wall, 126, of static upper spout assembly 116 is tapered (slants) downwardly until it meets the top end of lower slidable spout assembly 118. Worth noting at this time is that front wall 126 starts angling down at the very top of tube 22. Angled end wall 126 serves to deflect the grain in the upper half of tube 22 downwardly due to its inclination, with the momentum of the material flow also causing the flow to project outwardly. However, a front forward wall, 128, of slidable lower spout assembly 118 will stop that outward momentum, turning all flow directly downwardly, and in fact influencing all of the grain flow to turn downwardly and exit the spout traveling nearly all downwardly. Also seen in FIG. 16, is an unload auger, 130, housed within unloader 22. Unload auger 130 terminates with a bearing assembly, 132, carried by slanted wall 126.

It should be understood that hood 114 is tapered in that the hole at the bottom of hood 114 may be less wide and less long than at the top of hood 114, at the greatest diameter of auger tube 22. The size of the hole in the bottom must be such that it will pass all the material flow without congestion or significant slowing of material flow, but small enough that the material exits in a concentrated, uniform, and correctly directed stream downward, this being true of high flow rates, and significantly reduced flow rates such that the material is not "splattered" outside of the receiving container (truck or grain cart, etc.). The phantom arrows in FIG. 16 indicate the predominant grain flow.

Figure 14:
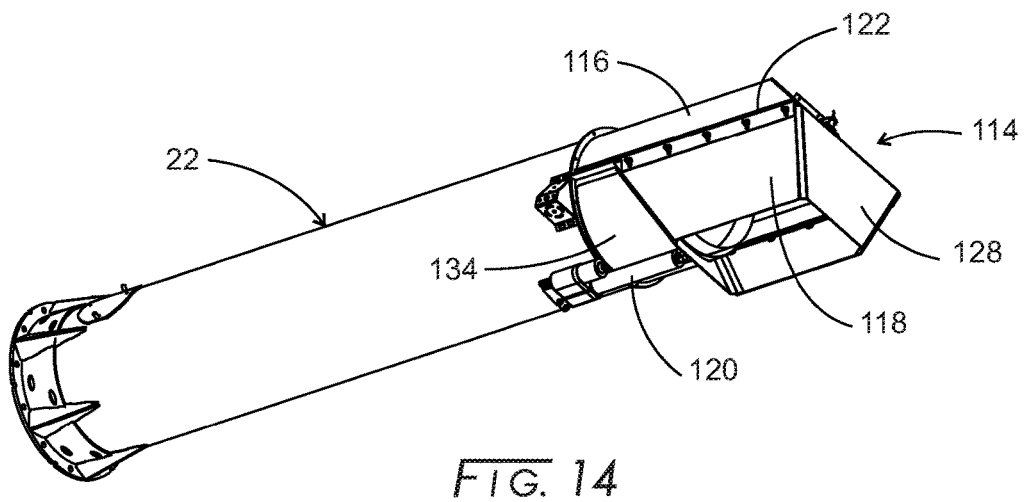
FIG. 14 is an isometric view of the grain unload auger assembly with its sliding end spout.
Figure 15:
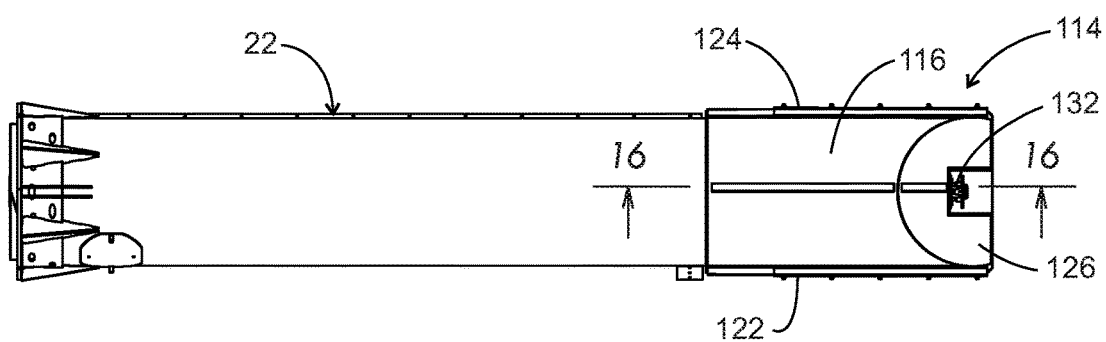
FIG. 15 is a top view of the grain unload auger assembly of FIG. 14.
Figure 17:
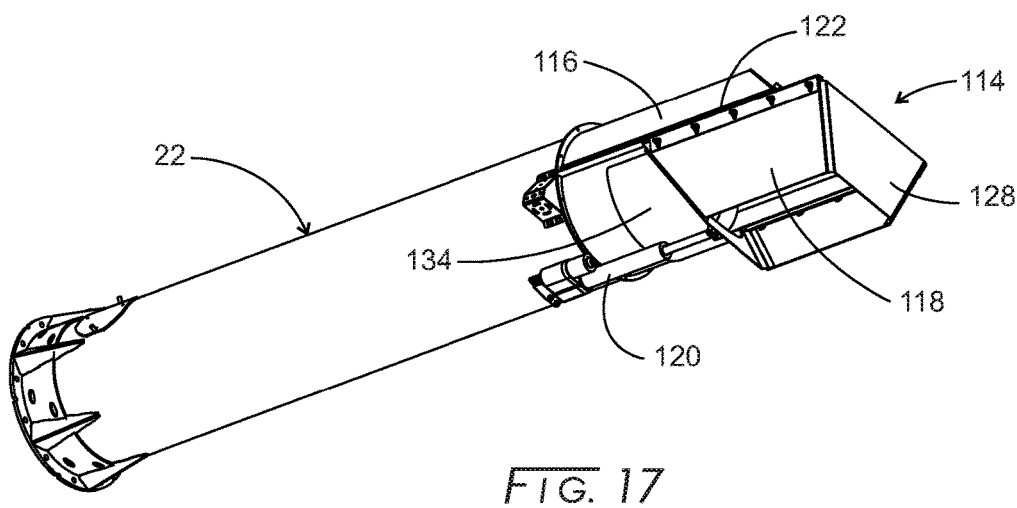
FIG. 17 is an isometric view from below of the grain unload auger assembly with its sliding end spout of FIG. 14.
Figure 18:
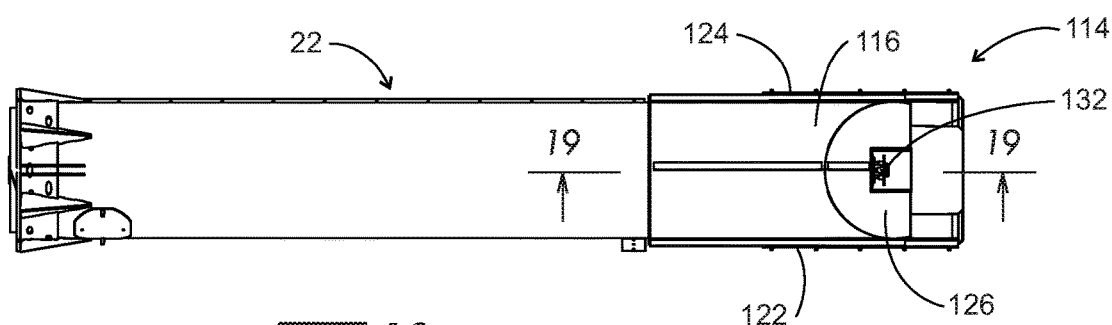
FIG. 18 is a bottom view of the grain unload auger assembly with its sliding end spout.
Figure 19:
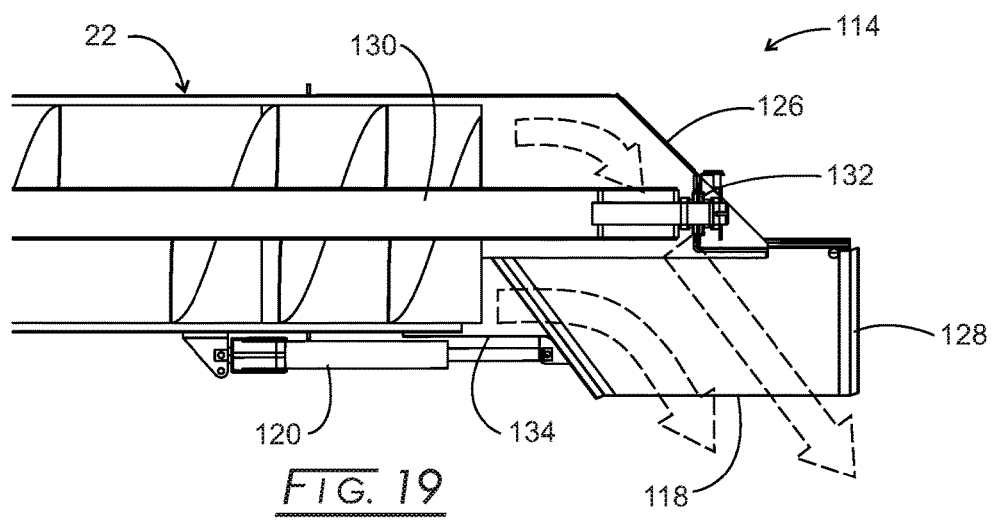

Hood assembly 114 is seen in is retracted position in FIGS. 14-16. In FIGS. 17-19, however, linear actuator 120 has been extended, resulting in lower slidable spout assembly 118 being extended outwardly, say about 12", relative to static upper spout assembly 116. A skirt, 134, also slides outwardly along with lower slidable spout assembly 118. Skirt 134 in its extended position, covers a portion of the lower opening in spout 114. FIG. 19, then, indicates the direction of grain flow by the phantom arrows with the extended orientation of the hood. The momentum of the grain carries it outwardly with sloped wall 126 turning it somewhat downwardly with the resultant direction of flow being outwardly and downwardly. Since vertical wall 128 now forward of the grain flow, which is primarily directed by sloped wall 126, the material flow is not deflected as downwardly when hood 114 is retracted, and the resultant target of the flow is in fact further outwardly than the end of unloader 22, especially given that unloader 22 typically can be some 4 to 6 feet above the receiving vessel in some cases. It should be understood that linear actuator can move to any location between its home or retracted position and its fully extended position, and at any position therebetween.

While the apparatus and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. In a grain harvesting articulated combine of a forward crop processing power unit (PPU, 12), a rear grain cart (14), and an articulation joint (26) that connects the PPU with the rear grain cart and includes an articular joint auger assembly (100) that moves clean grain from the PPU to the rear grain cart, the improvement which comprises:
 (a) an ascending fill lift auger assembly (56) that receives clean grain from the forward PPU and transports it upwardly and dumps the clean grain into the rear grain cart;
 (b) a pair of drag auger assemblies (78, 80) located at the bottom of the rear grain cart and dragging grain inwardly;
 (c) a grain unloader assembly (22) that receives grain from the drag auger assemblies and unloads clean grain from the rear grain cart;
 (d) two pump circuits delivering power to a pair of hydrostatic motors (55, 60) located in the rear grain cart, a first pump circuit hydrostatic motor (55) of the pair of hydrostatic motors driving the grain unloader assembly, a second pump circuit hydrostatic motor (60) of the pair of hydrostatic motors driving the ascending fill lift auger assembly (56), the drag auger assemblies (78, 80), and the articular joint auger assembly (100).

2. The improved grain harvesting articulated combine of claim 1, wherein the second pump circuit hydrostatic motor is connected to a common chain box for power distribution.

3. The improved grain harvesting articulated combine of claim 2, wherein the common chain box is clutched.

4. The improved grain harvesting articulated combine of claim 1, wherein powering of auger assemblies not moving grain permits inertias of these auger assemblies for startup or clog clearing of the other auger assemblies.

5. The improved grain harvesting articulated combine of claim 1, wherein the each drag auger assembly is covered by a door (84, 86) liftable for admittance of grain for movement of the grain.

6. The improved grain harvesting articulated combine of claim 5, wherein an actuator (88, 90) lifts the door.

* * * * *